Aug. 8, 1939.　　　　E. G. STAUDE　　　　2,168,719
MEANS FOR OBTAINING AND CONTROLLING FLUID PRESSURE
Filed Oct. 16, 1937　　　4 Sheets-Sheet 3

INVENTOR
EDWIN G. STAUDE
BY Harold Olsen
ATTORNEY

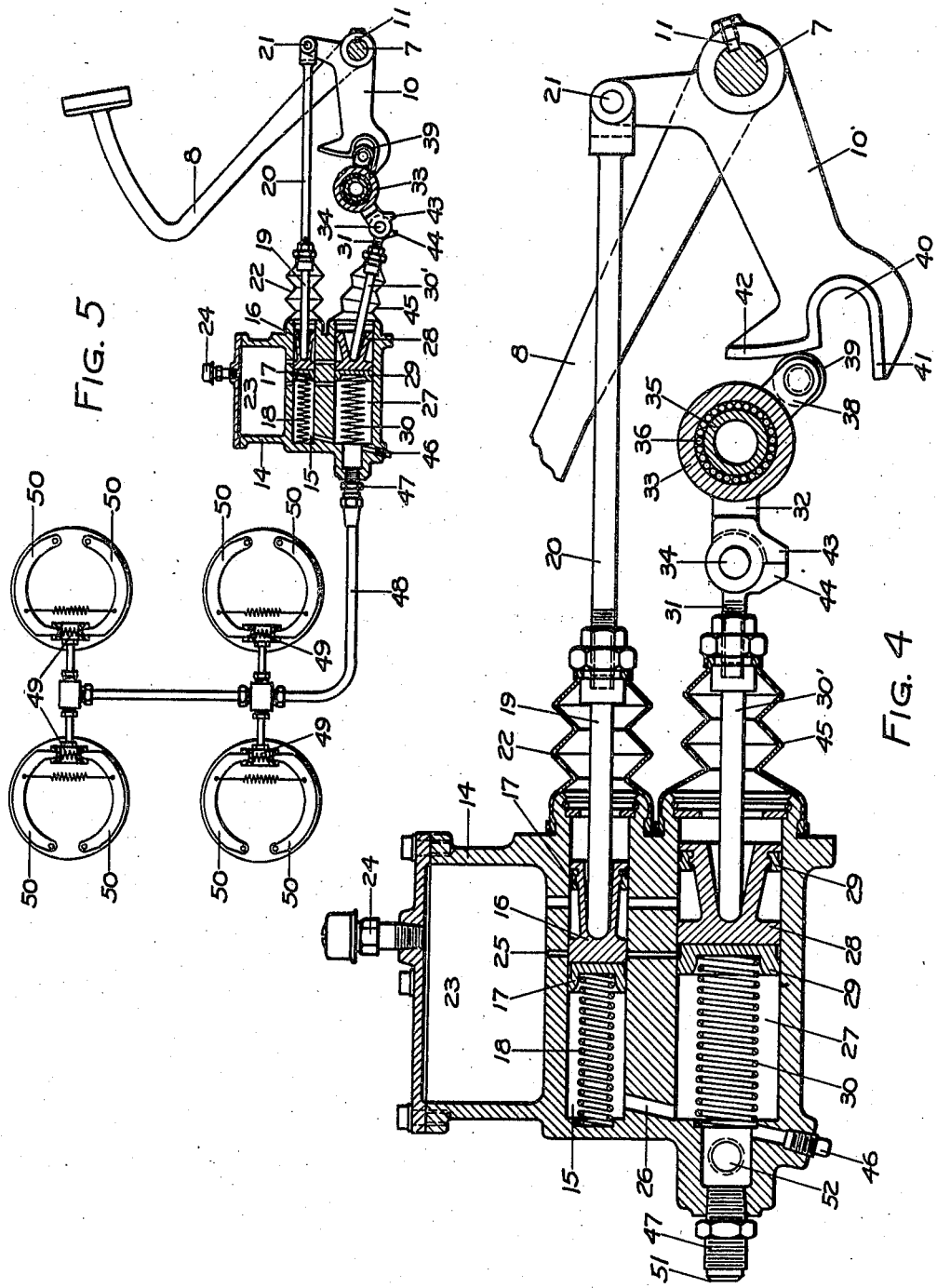

Patented Aug. 8, 1939

2,168,719

UNITED STATES PATENT OFFICE 2,168,719

MEANS FOR OBTAINING AND CONTROLLING FLUID PRESSURE

Edwin G. Staude, Minneapolis, Minn., assignor of one-half to Olive Bertha Staude, Minneapolis, Minn.

Application October 16, 1937, Serial No. 169,501

6 Claims. (Cl. 60—54.6)

This invention relates to a method and means for obtaining differential fluid pressure action, and finds valuable application as a fluid pressure actuator for hydraulic brakes. It will be understood, however, that although the specific combination of the device, with a hydraulic braking system is claimed per se, yet the principle of operation as a method or as a means, has a much wider application in the field of fluid pressure producing and controlling devices.

In conventional automobile trucks, buses, etc., it is customary to provide a single cylinder having a piston, operable either manually or by power, for creating pressure in the fluid system of hydraulic brakes to overcome the tension of the retractor springs and take up the clearances between the brake shoes and brake drums and to apply the brakes.

In order to create sufficient volume of piston displacement when the power is applied manually through a foot pedal traveling, for example, about four inches, the cylinder and piston have to be of such size that the required fluid pressures of eight hundred to one thousand pounds cannot be obtained without excessive manual pressure on the foot pedal. It is well understood that at the beginning of pedal motion or stroke very little pressure is required, because then it is more a question of quick volume than of high pressure, to merely overcome the resistance of the retractor springs on the brake shoes and move the shoes into contact with the brake drum.

It is therefore the object of my invention to provide a mechanism that will create quick volume and fast piston motion at the beginning of the stroke of the fluid displacing device in respect to travel, and then when actual braking performance is required, to accomplish this with a much smaller piston area in order to reduce pedal pressure, or with other power application in addition to the pedal, since after the slack is once taken up very little additional stroke movement is required, since it is then largely a matter only of applying additional pressure. This device may be used for purposes other than applying brakes on motor cars, trucks, buses or railway cars, etc., because it may easily be applied to clutches or other vehicle controls or may even be applied to operate remote controls on industrial machinery.

Features include: the arrangement of the cylinders; the means by which they are interconnected; the specific structures for controlling the movements of translatable elements, like pistons, for any purpose; the method of controlling the pistons to operate both and then discontinue the operation of one while continuing operation of the other; the use of the method and apparatus in conjunction with a hydraulic brake; the method irrespective of its specific use; and all details of construction and mechanical movements, along with the broader ideas of means inherent in the disclosure.

Features and advantages will appear in the description of the drawings forming a part of this application, and in said drawings, Figure 1 is a plan view showing my invention bolted to the left side frame of a motor vehicle chassis;

Figure 1:
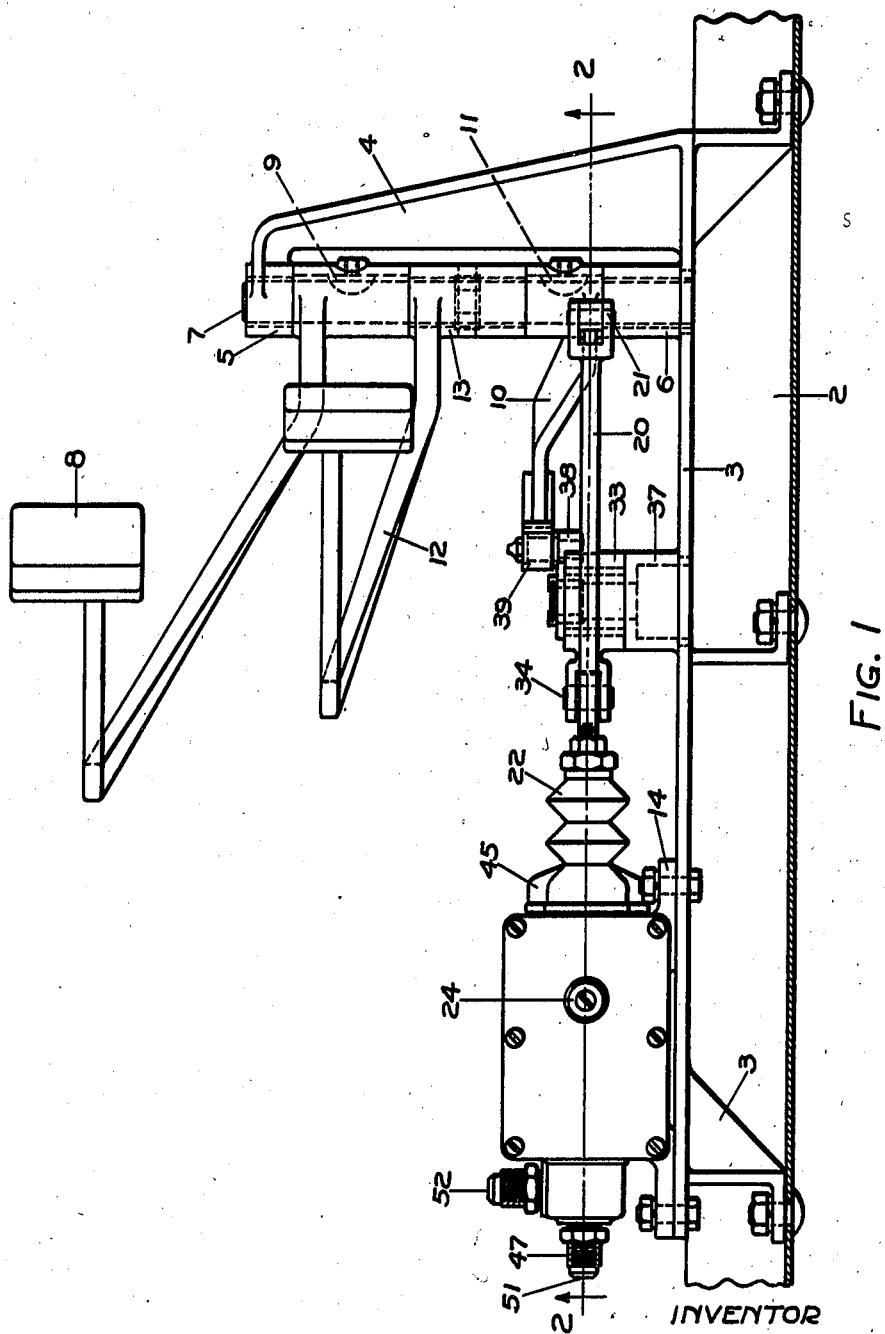
Figure 2:
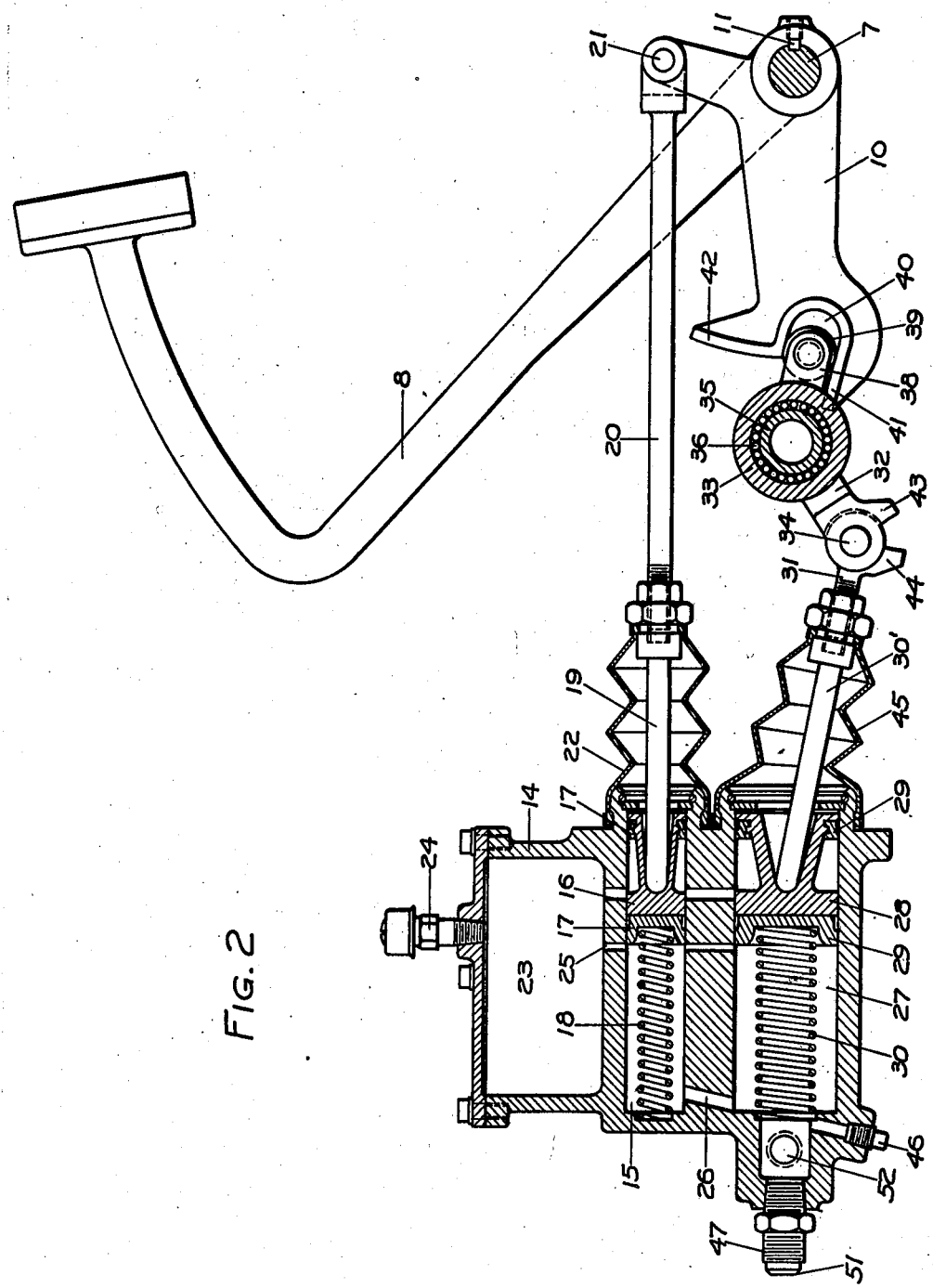
Figure 2 is a vertical section on the line 2—2 of Figure 1, showing the actuator pedal at its upper limit, with the pistons in both the primary and secondary cylinders, at their inactive positions.
Figure 3:
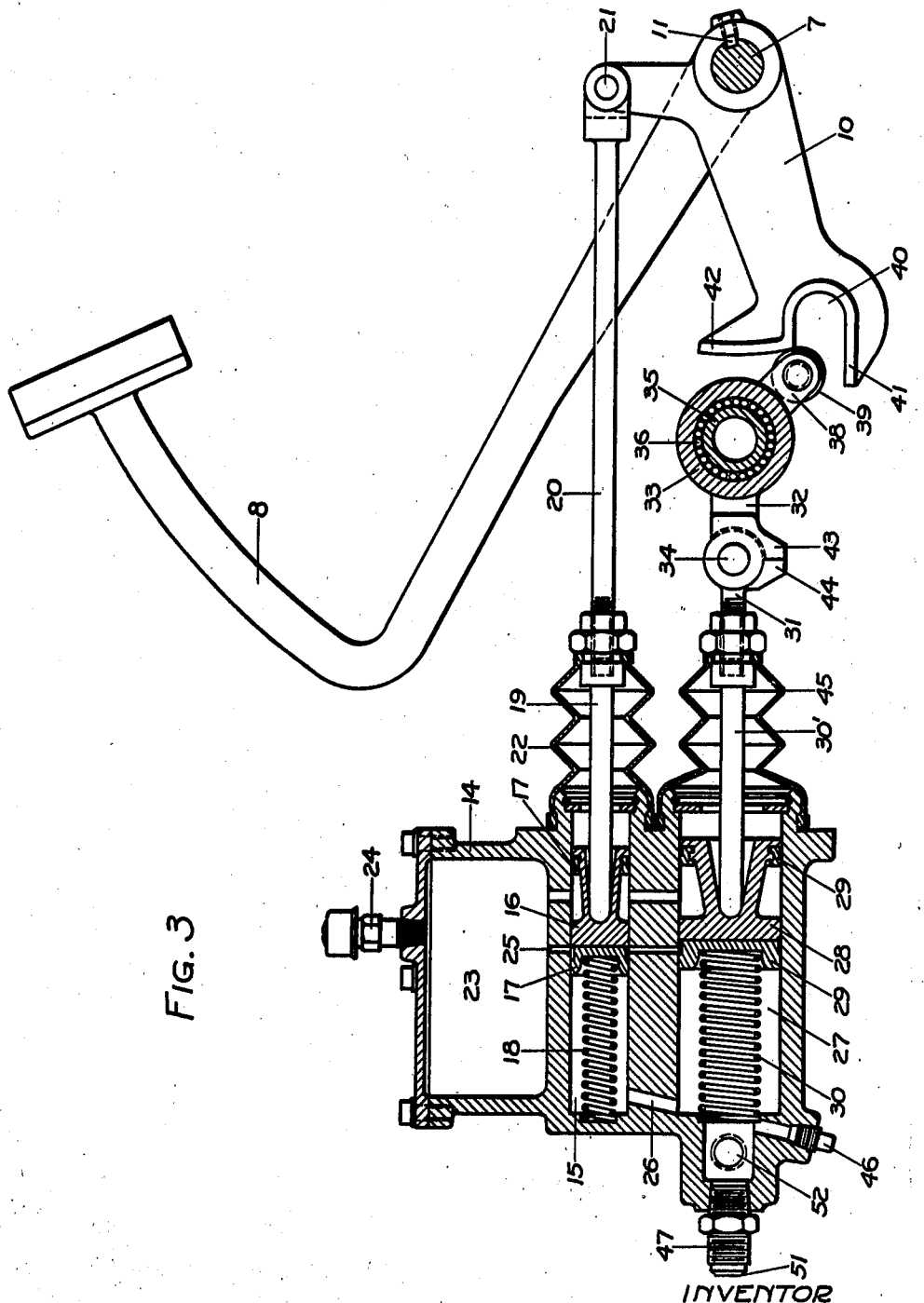
Figure 3 is a view similar to Figure 2 but showing the actuator pedal partly depressed, and both pistons advanced to create quick volume, and showing the secondary piston locked against further travel, while the piston of the primary cylinder of smaller diameter continues its motion to create high pressure.

Figure 4 is a view similar to Figures 2 and 3, showing the actuator pedal further depressed, and showing small increased displacement in the primary cylinder, while the piston in the secondary cylinder remains stationary and is held against retrograde motion; and Figure 5 is a diagrammatic application of a specific form of pressure actuator to four wheel brakes of a motor vehicle, the pressure actuator being in the inatcive position, as in Figure 2.

Referring now to the drawings, numeral 2 represents the side frame of the chassis of a motor vehicle to which is secured the frame member 3, or support for mounting the device herein. The member 3 has a bracket extension 4 in which are provided bearings 5 and 6 for the rock shaft 7. A pedal or actuator 8 is keyed to the rock shaft 7 as at 9. A bell-crank 10 is also keyed to the rock shaft 7 at 11.

When the invention is used for motor vehicles, there is provided the usual clutch pedal 12 with a hub 13 which pivots freely on the shaft 7. Other pedals may be mounted on this shaft. To the frame 3 is secured the pressure cylinder casing 14. The cylinder casing 14 has a bore 15 defining the diameter of the primary cylinder, and in said bore is a piston 16 provided with suitable packing 17. A spring 18 is adapted to constantly press the piston 16 against the actuator rod 19, which rod enters a conical socket in the end of the piston. The actuator rod 19 is provided with an extension 20 connected as at 21 to one arm of the bell crank 10. The usual bellows or boot 22 protects the cylinder from dirt and other foreign material, and this boot is clamped at its outer end for motion with the rods 19 and 20.

A fluid reservoir 23 is provided with a filling cap 24. A vent 25 permits the fluid to enter the cylinder 15, but return or back flow is prevented by the piston as it advances from its position in Figure 2 to that of Figure 3. A passage 26 connects the primary cylinder 15 with the secondary cylinder 27, which latter cylinder has a piston 28 having suitable packing 29.

A spring 30 bears continuously against the piston 28 to normally keep it in the inactive position shown in Figure 2. The piston 28 has a socket receiving an actuator rod 30' which rod is provided with an extension 31 pivotally or hingedly connected to one arm 32 of a bell-crank member 33 as at 34. The bell-crank member 33 is pivoted on a stud 35 preferably provided with anti-friction needle bearings 36. The stud 35 is secured to the frame member 3 as at 37. The member 33 is provided with an arm 38 having a roller 39 operating in a slot or fork 40 of the bell-crank 10.

The bell-crank 10 is provided with an extension stop 41 and a radial surface 42. A suitable stop 43 is provided on the arm 32 and another stop 44 is provided on the extension 31. These stops are designed to permit a hinge action at 34, but not to permit swinging beyond the dead center of a line passing through the center of the stud 35 and the inner end of rod 30'. It will of course be understood that the lugs or stops 43, 44, merely limit the degree of swing, and that other equivalent means may be used for arresting the forward motion of the piston 28 at the proper time and in proper relation to the motion of piston 16.

A suitable bellows boot 45 is provided to keep dirt or other foreign substance out of the cylinder 27. The cylinder 27 is provided with a drain plug 46 and with outlet plugs 47 having outlets 51 and 52. A tube or conduit 48 may be connected to the outlet plug 47 and by means of suitable connections with the brake shoe cylinders 49 which actuate the brake shoes 50.

In the operation, pressure on the pedal actuator 8, Figure 2, advances both the piston 16, which is of small diameter, and the piston 28, which is of much larger diameter. The fluid of the small piston 16 flows through the passage 26 into the cylinder 27 and the displacement of fluid by both pistons 16 and 28 occurs, the outflow being through the outlet plug 47 to the single pressure line 48. The size of the cylinder 27 and the piston 28 plus the length of the stroke is so calculated as to provide for just enough displacement in relation with the smaller cylinder 15 and piston 16 as will cause it to come to rest as shown in Figure 3 approximately just after all of the slack has been taken up in the system, and when the brakes are ready to be applied by pressing the brake shoes against the brake drums.

The toggle joint with its related parts so act that the piston 28 is held at the position of Figure 3 while the piston 16 continues to advance, the entire thrust being sustained by the stud 35 so as not to cause increased friction against the bearings of the pedal actuator 8. The arcuate surface 42 of the arm 10 continues to act on roller 39 to maintain the arm 38 and related parts in the positions shown in Figures 3 and 4.

Since no great additional motion of the pedal actuator is necessary after the slack in the system has been taken care of by the action of the two pistons 16 and 28, the cylinder 15 and piston 16 can be greatly reduced in size over that heretofore required and yet be capable of creating very high fluid pressure for urging the brake shoes against the brake drums, without much muscular exertion on the pedal actuator. The construction permits mounting of the whole unit rigidly in one casting member 3, and enables one to obtain maximum of efficiency, with minimum of size. The illustrated device is particularly adapted for 1½ to 3 ton trucks, light buses and heavy motor cars.

The outlet 52 may be connected to operate hydraulic brakes on trailers and may also be successfully used in connection with vacuum power boosters or any other auxiliary power in addition to the pedal actuator.

It will be understood that it is not necessary to have the pistons operate simultaneously. One piston could operate first and at the end of its stroke another piston could start operating. For example, the large piston could operate first and then the small piston. There is therefore no intention to limit the invention entirely to simultaneous operation of the pistons.

I claim as my invention:

1. A manually operated fluid pressure actuator for hydraulic brakes comprising fluid displacing cylinders, a piston for each cylinder, and means for operating the pistons for limiting the displacement action of one, while continuing displacement action of the other, said means including a rock shaft having a bell crank lever thereon, a thrust member by which one arm of the bell crank operates one of the cylinders, and a break-joint thrust connection operated by the other arm of the bell crank.

2. In combination with a fluid operable device, a pair of intercommunicating cylinders having pistons, an outlet for the cylinders connected for operating said device, and means for initially simultaneously advancing both pistons in power-stroke direction, and then arresting the advance of one of the pistons while continuing the advance of the other, including a break-joint thrust connection for one of the pistons, a thrust connection for the other piston, a rock lever having one portion operating said break-joint thrust connection to bring the joint from broken-joint position to non-broken-joint position, thereby to start and stop displacement action of one of said pistons, the other arm of said lever acting at the same time to operate thrust connection of the other piston.

3. In a device of the class described, a bell crank lever, one arm of which has a surface which is concentric with the axis of rotation of the lever, said arm having a recess which intersects said surface, a pair of cylinders having pistons, means for operating one of the pistons including a device having a break joint and having a member which is operated upon by said recess to cause the joint to assume non-broken condition and thereby arrest motion of the corresponding piston, and which engages said concentric surface when the joint is in non-broken condition, said surface serving to hold the joint in non-broken position while piston operating motion of said bell crank lever continues, and means operated by the other arm of said bell crank lever for simultaneously operating the other piston, whereby both pistons are initially simultaneously operated and then operation of one piston is arrested while operation of the other is continued.

4. In a device of the class described, a pair of members to be moved, a first thrust element for moving one of the members and a second break-joint thrust element for moving the other member, and means including a rock lever having two arms, each operating one of said thrust elements, so that as the first member is moved, the break joint is moved to non-break position, thereby limiting the movement of said second member while continuing the movement of said first member.

5. In a device of the class described, a pair of cylinders each having a piston therein, means for advancing the pistons including a rock shaft having a bell crank lever thereon, means by which one arm advances one of the pistons, a break-joint thrust element comprising first and second hinged together parts normally out of alinement, the first part engaging said other piston and the second part being rotatably mounted, and means respectively on the second part and on the other arm of said bell crank lever by which said second part is rotated to bring the parts into alinement to advance the second piston when the shaft is rotated to advance the first, and whereby after the parts are in alinement the movement of the second piston is arrested while the movement of the first may be continued by mottion of said rock shaft in the same direction.

6. A manually operated fluid pressure producer for operating brake cylinders, comprising a pair of cylinders and pistons of different displacements and having a common outlet in communication with the brake cylinders, a pedal pivoted on a support, operative connections between said pedal and the smaller piston for developing pressure in the cylinder, toggle means pivoted on a different support and connected with the larger piston for developing pressure in the larger cylinder and a mechanical connection between said pedal and said toggle means for straightening out the toggle and thereby moving the larger piston on its pressure development stroke.

EDWIN G. STAUDE.